United States Patent [19]
Brana

[11] Patent Number: 5,219,399
[45] Date of Patent: Jun. 15, 1993

[54] ANTIPOLLUTION AND FUEL ECONOMY DEVICE AND METHOD FOR AN INTERNAL COMBUSTION ENGINE

[76] Inventor: Branislav V. Brana, 3001 W. Warmsprings Rd., Henderson (Las Vegas), Nev. 89014

[21] Appl. No.: 816,392

[22] Filed: Dec. 27, 1991

[51] Int. Cl.[5] ............................................. F02G 5/00
[52] U.S. Cl. ..................................... 123/557; 123/549
[58] Field of Search ............... 123/557, 549, 552, 553, 123/549, 546, 547

[56] References Cited

U.S. PATENT DOCUMENTS

| | | | |
|---|---|---|---|
| 4,180,036 | 12/1979 | Wolf | 123/557 |
| 4,393,851 | 7/1983 | Gorans | 123/557 |
| 4,401,091 | 8/1983 | Costello et al. | 123/557 |
| 4,527,533 | 7/1985 | Laramee | 123/557 |
| 4,590,914 | 5/1986 | Rosky et al. | 123/557 |
| 4,798,191 | 1/1989 | King | 123/557 |
| 4,823,757 | 4/1989 | Redele | 123/557 |
| 4,829,969 | 5/1989 | Ray | 123/557 |
| 4,862,859 | 9/1989 | Yunick | 123/545 |
| 4,926,831 | 5/1990 | Earl | 123/557 |
| 4,955,351 | 9/1990 | Lewis et al. | 123/557 |
| 5,036,825 | 8/1991 | Stone | 123/557 |
| 5,042,447 | 8/1991 | Stone | 123/557 |

FOREIGN PATENT DOCUMENTS

8400424  5/1984  Brazil .

Primary Examiner—Noah P. Kamen
Attorney, Agent, or Firm—Neil F. Markva

[57] ABSTRACT

A method and apparatus for an internal combustion engine liquid fuel delivery system includes an electrical power source to preheat fuel to a maximum temperature for the fuel to remain in the liquid phase just below the fuel vaporization. Preheating takes place immediately before delivery to the engine's carburetor. Fuel is heated in a dual coil assembly having an adjustable valve that controls the volume of fuel flowing through the heating assembly. A temperature control apparatus maintains the fuel temperature at fuel pre-vaporization temperature. The retrofit system includes a solenoid that selectively directs fuel through either the fuel delivery preheating system or the engine's existing fuel delivery system. An operator's control panel for activating or deactivating the solenoid-controlled valve means and the preheating device is located inside the driver's compartment. The control panel allows the vehicle operator to set a desired preselected temperature and displays the actual temperature of the fuel entering the carburetor. Preheating fuel to a maximum preselected temperature immediately before entering the carburetor effects maximum expansion of liquid fuel, improved fuel-air mixture, and a more complete burning which substantially and unexpectedly improves output horsepower and fuel economy while reducing engine component carbon sediment and gaseous exhaust atmospheric pollutants.

22 Claims, 4 Drawing Sheets

Fig. 11 ns. More specifically, the invention relates to an apparatus and a method for heating liquid fuel to provide an improved fuel-air mixture, and a more complete burning which substantially and unexpectedly improves output horsepower and fuel economy while reducing engine component carbon sediment and gaseous exhaust atmospheric pollutants.

ANTIPOLLUTION AND FUEL ECONOMY DEVICE AND METHOD FOR AN INTERNAL COMBUSTION ENGINE

FIELD OF THE INVENTION

This invention generally relates to internal combustion engine liquid fuel preheating systems. More specifically, the invention relates to an apparatus and a method for heating liquid fuel to provide an improved fuel-air mixture, and a more complete burning which substantially and unexpectedly improves output horsepower and fuel economy while reducing engine component carbon sediment and gaseous exhaust atmospheric pollutants.

BACKGROUND OF THE INVENTION

Many known inventions address the issue of liquid fuel combustion with an eye toward efficiency and completeness of the burning of the fuel. Various attempts include a fuel device that preheats fuel prior to entry to the carburetor. Several U.S. patents and Applicant's own prior disclosure to the Brazilian Patent Office relate to such preheating systems.

U.S. Pat. No. 4,926,831 discloses a fuel vaporization apparatus whereby the device delivers atomized fuel into a heated vapor generator chamber before it enters the carburetor. Temperature sensors are used to control the device for operation only at periods when the vapor generator chambers are heated sufficiently to vaporize the fuel.

U.S. Pat. No. 4,862,859 discloses a method and apparatus for operating an internal combustion engine having an electronic ignition. This prior art system uses heat normally discharged to the ambient atmosphere to condition and prepare the fuel mixture before entry into the combustion chambers. The fuel is vaporized and mixed in a particular fashion with additional fuel.

In 1985, Applicant filed a patent application Ser. No. 8,400,424 with the Brazilian Ministry of Industry and Commerce, Institute of Industrial Properties. Applicant's earlier device preheated the fuel for an internal combustion engine up to a desired maximum temperature and delivered the fuel at that temperature to the engine carburetor. The disclosed apparatus incorporated a control means for the fuel to flow through the preheating zone and fuel temperature.

Several other U.S. patents disclose various mechanisms for improving engine economy and efficiency in an internal combustion engine. However, neither the U.S. patents nor Applicant's Brazilian patent application disclose, teach or suggest, either singularly or in combination, the entirety of the features of his present invention.

PURPOSE OF THE INVENTION

The primary object of the invention is to provide an improved internal combustion engine liquid fuel delivery system.

A further object of the present invention is to provide maximum pre-combustion expansion of liquid fuel.

Another object of the invention is to provide a liquid fuel combustion zone with an improved fuel-air mixture.

Still another object of the invention is to achieve a more complete and efficient burn of liquid fuel through fuel preheating immediately prior to fuel carburetion.

Another object of the invention to improve engine output horsepower, increase fuel economy, decrease gaseous exhaust atmospheric pollutants, and decrease engine component and spark plug carbon deposits from fuel combustion.

A further object of this invention is to provide a fuel preheating system that can be used without affecting the engine manufacturer's operating specifications.

A still further object of the present invention is to provide a retrofit fuel preheat system that can be easily installed with very little modification of the factory fuel delivery system while using commonly available component parts that are easily removed for servicing the retrofit fuel preheat system.

SUMMARY OF THE INVENTION

The present invention is directed to an internal combustion engine liquid fuel delivery system, a vehicle engine's carburetor. The delivery system includes means to preheat fuel to a point just below the fuel vaporization temperature immediately prior to delivery of the liquid fuel to the carburetor.

The retrofit system of the invention may be easily installed into the pre-existing fuel delivery system for an internal combustion engine. The retrofit system includes a solenoid-controlled valve means that selectively directs fuel through either the retrofit fuel preheating system or the vehicle engine's existing fuel delivery system.

The vehicle's fuel pump pumps fuel from the fuel tank up to the solenoid-controlled valve means. The solenoid becomes operative when the engine ignition system is activated but can be manually deactivated by the vehicle operator. The solenoid for the valve means is controlled from an operator's control panel having a switch for activating or deactivating the solenoid.

In a land vehicle, the control panel is located on the dashboard inside the operator cabin. When the solenoid is activated, fuel is directed toward a fuel preheating unit. When the solenoid is deactivated, the valve means directs the fuel through the vehicle's existing fuel delivery system.

The fuel preheating unit of the invention includes a heating zone having an inlet and an outlet. Tubular coils define a flow path for the fuel through the preheating zone.

Fuel entering the preheating zone will ingress a heating chamber that is encased in a housing composed of insulating material such as plaster of paris or ceramics. The fuel is heated in conventional ways with heating elements such as high wattage resistors, plates, tubes, etc. disposed adjacent tubular coils defining the fuel flow path. The engine's battery provides the direct current power source for the heating elements. A thermostatically controlled relay directs power from the battery to the heating elements.

The fuel enters the heating zone inlet at one end of an outer first tubular coil disposed about an inner second tubular coil. A micro-valve connects the two tubular coils within the heating chamber. The micro-valve is adjustable to control the fuel flow through the tubular dual coil assembly. In a specific embodiment, the microvalve is manually adjusted. The outlet of the inner tubular coil is the outlet for the heating zone from which the preheated fuel is directed to the engine's carburetor.

The fuel passes by a fuel temperature sensor located at the fuel outlet of the heating zone. The sensor is in an electrical circuit with a thermostat device and the relay to the heating elements in the housing. The thermostat or control device is located on the operating panel with the solenoid switch and may be preset by the operator who inputs a preselected fuel temperature.

The preset preselected temperature is compared by the system control device to the fuel temperature sensed at the heating zone outlet. When necessary, adjustments are made by the thermostat sending an electrical signal to the relay to increase or decrease power to the heating elements. The preset fuel temperature is for the fuel just prior to entry to the engine's carburetor and is maintained within ±2° F. of the preset temperature at a point just below the fuel vaporization temperature. The preset fuel temperature is in the range of 5°-10° F. below the fuel vaporization temperature.

Any detected extreme temperature at the fuel temperature sensor or a failure of the electrically powered component of the present device will cause the relay to turn off all power to the fuel heating elements. Furthermore, the solenoid will be taken out of the operational mode to redirect the fuel flow path to return to the engine's normal fuel delivery system. This may be done automatically by the system or manually by the operator who can manipulate the appropriate switch on the dashboard installed control device.

Preheating the liquid fuel to the prevaporization temperature stage immediately prior to the fuel entering the carburetor produces a maximum volume expansion of liquid fuel. The use of expanded fuel reduces the volume of fuel required from the vehicle's fuel tank. Overflow at the fuel pump caused by the lower fuel volume demand returns directly to the fuel tank in an unheated condition.

The expansion of fuel to its maximum volume improves the fuel-air mixture. An optimal fuel-air mixture during combustion yields a more complete burning which, in the present invention, substantially and unexpectedly improves output horsepower and fuel economy while reducing engine component carbon sediment and gaseous exhaust atmospheric pollutants.

The thermostat or control device has a visual display with a toggle switch to manually change the display to either the input preset temperature valve or the real time actual fuel temperature as sensed by the fuel temperature sensor.

Another operator panel switch allows the engine to be easily run with or without the fuel preheat system by manually activating or deactivating the solenoid-controlled valve means.

The retrofit system of the present invention may be easily installed on a conventional liquid fuel internal combustion engine such as is found in a typical passenger car. Such an installation may be made without affecting the engine manufacturer's operating specifications and with very little modification of the factory fuel delivery system while using commonly available component parts. Additionally, component parts are easily assembled and installed to permit quick and simple removal to maintain or service the retrofit fuel preheat system.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
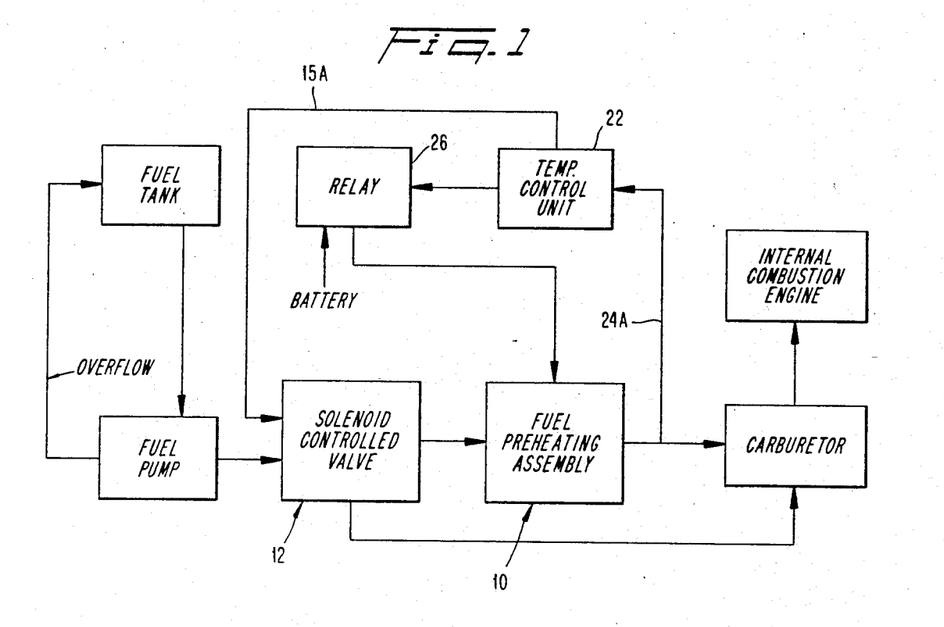
FIG. 1 is a schematic flow diagram showing the interrelationship of the various components of the present invention.

The liquid fuel preheating apparatus as schematically shown in FIG. 1 comprises a heating assembly, generally designated 10, including a preheating zone having an inlet and an outlet. Means are connected to a standard fuel delivery system of a vehicle for directing moving liquid fuel from a first flow path into a second flow path through the heating means. Microvalve means 14 is used to control the volume of liquid fuel flow through the heating means at a location between the inlet and outlet of the heating zone.

The heating means includes a heating element 19 effective to heat the liquid fuel as it moves along the second flow path through the heating zone. Sensor means 24 sense the temperature of the preheated liquid fuel as it exits the heating zone outlet. Control unit 22 and relay 26 maintain the liquid fuel at a preselected temperature sufficient to expand the liquid fuel, without vaporizing the liquid fuel, by an amount effective to achieve maximum combustion of the liquid fuel.

Figure 2:
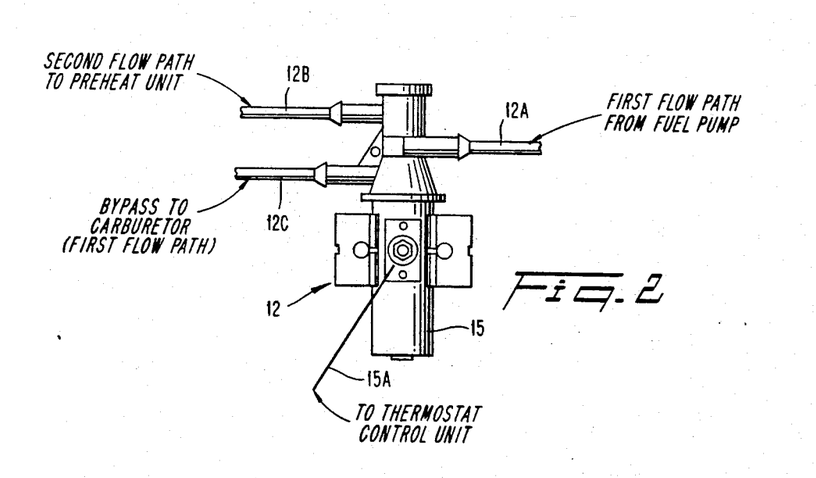
FIG. 2 is an elevational view of a solenoid-controlled valve of the invention.

In this specific embodiment, a solenoid-controlled valve means 12 is used to direct the moving liquid from the first flow path to the second flow path. Microvalve means 14 is used to control the volume of liquid fuel flow through the heating zone and is manually adjustable in this specific embodiment. The automatic control of the adjustable valve means is also within the contemplation of this invention.

Figure 3:
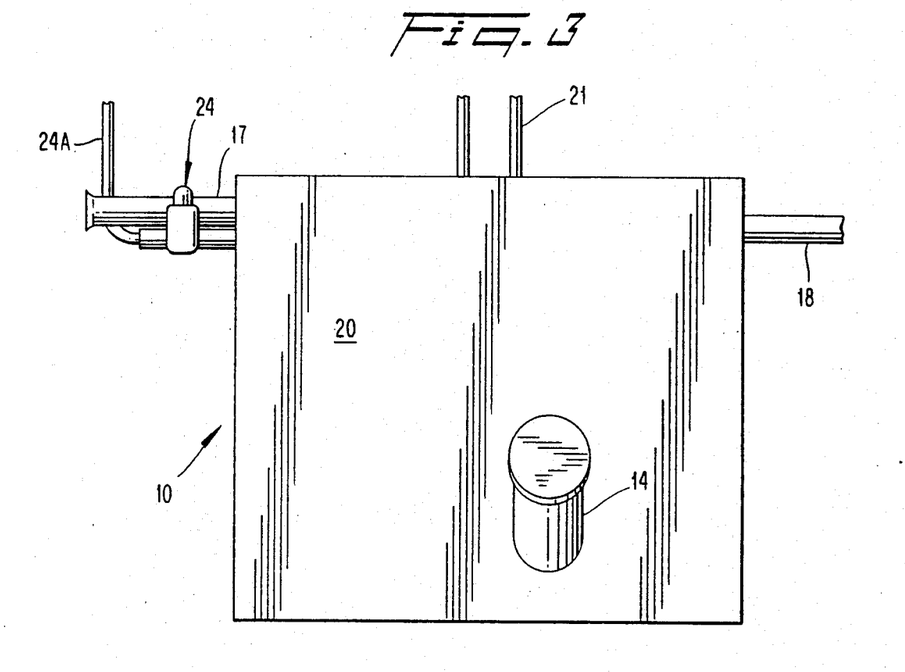
FIG. 3 is a front elevational view of the fuel preheating tubular coil unit according to the invention.
Figure 4:
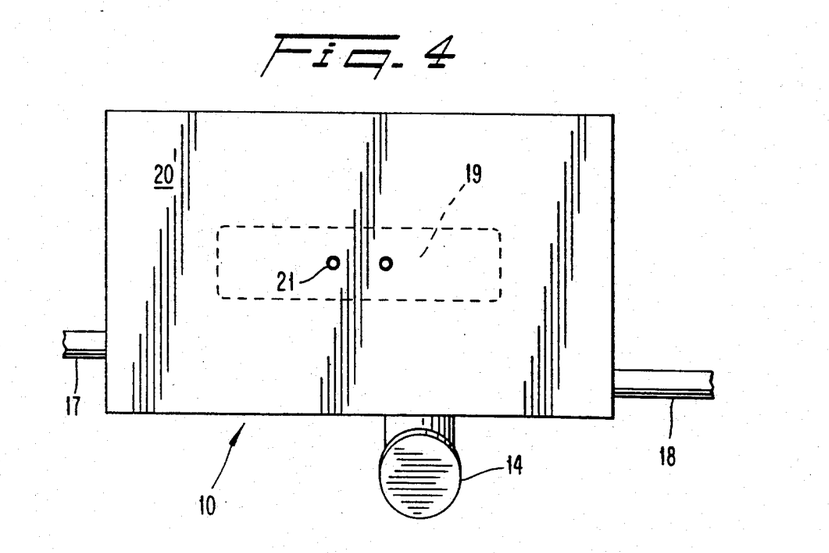
FIG. 4 is a top plan view of the unit of FIG. 3.
Figure 5:
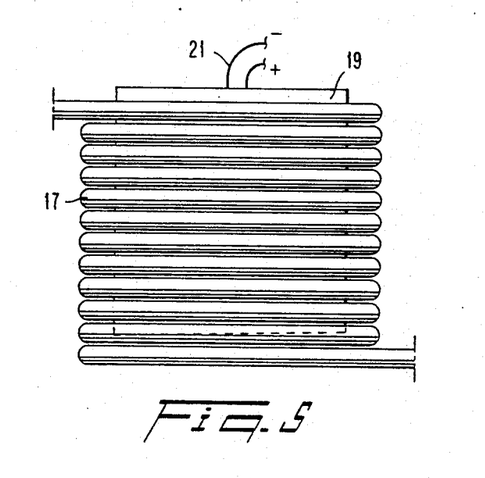
FIG. 5 is an elevational view of a tubular inner coil used in the unit of FIG. 3.
Figure 6:
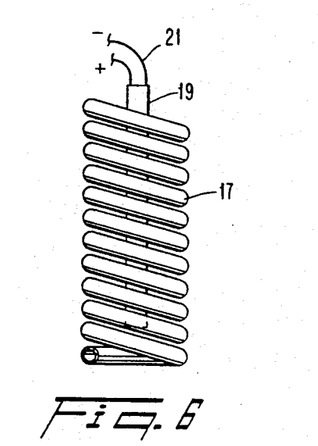
FIG. 6 is a side elevational view of the tubular inner coil of FIG. 5.
Figure 7:
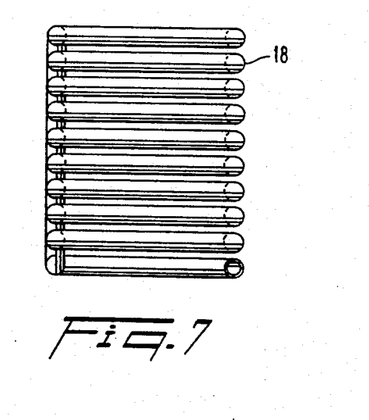
FIG. 7 is a side elevational view of a tubular outer coil of a coil assembly made in accordance with the invention.
Figure 8:
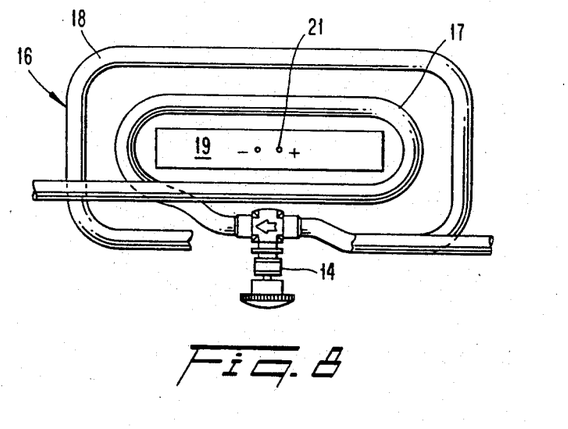
FIG. 8 is a fragmentary top plan view of a tubular coil assembly of the invention showing the microvalve connection at the bottom of the assembly.

The heating means comprises a coil assembly 16 including an inner tubular coil 17 and an outer tubular coil 18. Outer tubular coil 18 includes the heating zone inlet and inner tubular coil 17 includes the heating zone outlet. The adjustable microvalve 14 connects the inner ends of the inner and outer coils within the heating zone as shown in FIG. 8.

Closed housing 20 defines the heating zone with the coil assembly 16 being disposed within housing 20. Heating element 19 includes an electrical heat generating component powered by a direct current source (not shown) via electrical connections and lead lines 21.

The temperature maintaining means includes thermostat control unit 22 responsive to the temperature sensed by sensor 24 to switch heating element 19 on and off to thereby keep the temperature of the liquid within ±2° F. of the preselected temperature.

The temperature maintaining means of this embodiment also includes a relay device 26 electrically connected to a battery as a direct current source to the heating component 19 and to the thermostat control unit 22 as shown.

The solenoid-controlled valve means 12 includes an input port 12A and first and second output ports 12B and 12C. Input port 12A receives delivery of liquid fuel from the fuel pump in the first flow path. First output port 12B is connected to outer coil 18 at the heating means inlet to direct fuel along a line defining the second fuel flow path.

Second output port 12C is connected to direct fuel along a line defining the first flow path. The solenoid-controlled valve means 12 includes a solenoid 15 powered by an electrical source (not shown). Electrical signals received via electrical connector 15A actuate solenoid 15 to thereby direct fuel either through first output port 12B or through second output port 12C.

Figure 9:
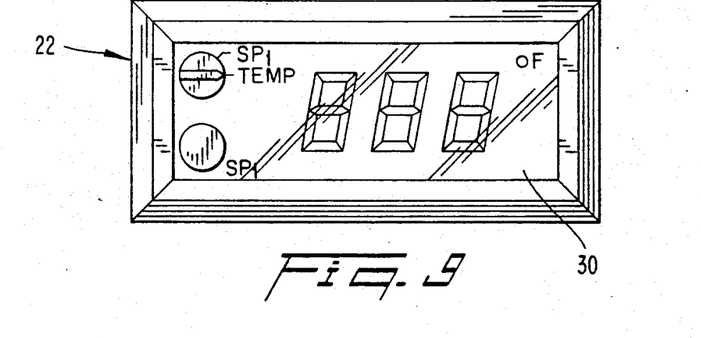
FIG. 9 is a front elevational view of a control unit made in accordance with the invention showing the display panel of the unit.
Figure 10:
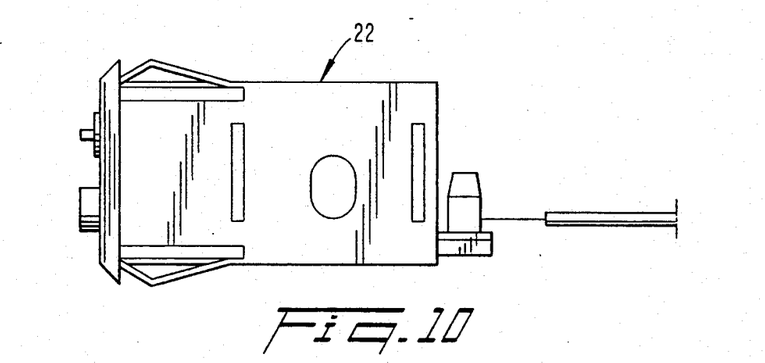
FIG. 10 is a side elevational view of the control unit of FIG. 9.
Figure 11:
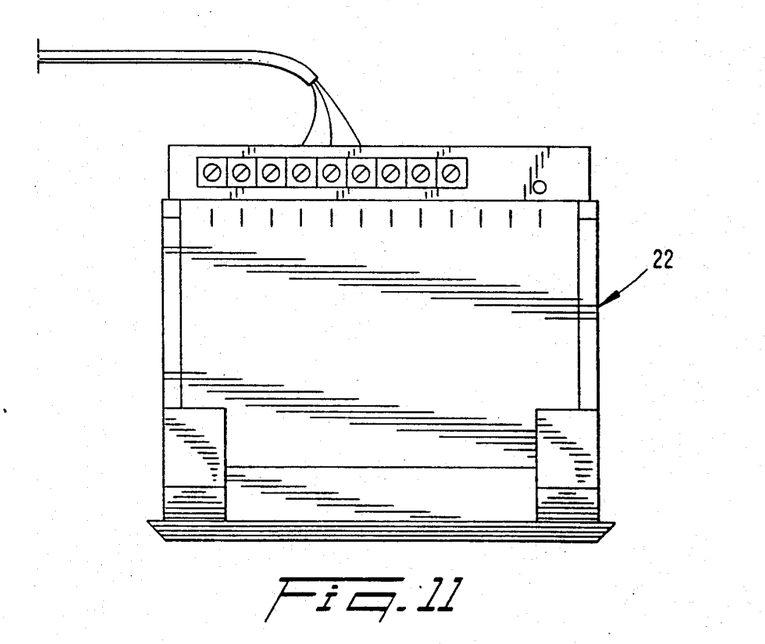
FIG. 11 is a top plan view of the control unit of FIG. 9.

Thermostat control unit 22 of this embodiment includes first and second electrical input means, visual display means, toggle means and first and second switch means. The first electrical input means is for manually presetting a preselected temperature value. The second electrical input means is for electrically receiving an electrical signal from sensor 24 identifying the actual fuel temperature sensed at the heating zone outlet.

Visual display means 30 is for displaying the preset preselected temperature value and the actual fuel temperature at the heating zone outlet. The toggle means is for changing the display means to either the display of the actual outlet temperature or the preselected temperature. The first switch means is for inputting an electrical control signal to solenoid-controlled valve means 12. The second switch means is for inputting an electrical control signal to heating element 19 within housing 20.

Liquid fuel preheating assembly 10 is retrofit into an existing internal combustion engine liquid fuel delivery system. The fuel temperature sensor 24 located at the heating zone outlet electrically signals the thermostat control unit 22 via line 24A to ultimately control heating element 19.

Thus, the sensed fuel temperature is maintained within 2° F. of the preset preselected temperature. Output port 12C of solenoid-controlled valve means 12 directs fuel to a fuel-air mixing device such as a carburetor for the internal combustion engine thereby bypassing the preheating flow path through the system's heating zone.

The liquid fuel preheating process of this invention directs liquid fuel from a first flow path into a second flow path that extends through a heating zone having an inlet and an outlet. The volume of liquid fuel flow through the heating zone is controlled via microvalve 14 at a location between the inlet and outlet of the heating zone. Liquid fuel is heated as it flows along the second flow path through the heating zone.

The temperature of the liquid fuel is sensed as it flows out of the heating zone outlet. The liquid fuel is maintained at a preselected temperature by controlling (1) the electrical power to heating element 19 and (2) the particular volume of flow through tubular assembly 16.

The purpose of preheating assembly 10 is to expand the liquid fuel by an amount effective to achieve maximum fuel combustion with liquid fuel. The preselected temperature is set at the maximum temperature at which the fuel remains in the liquid phase. The preselected temperature is in the range of about 5° F. to 10° F. less than the vaporization temperature of the fuel.

In this specific embodiment, the liquid fuel directing step includes automatically directing the liquid fuel from the second flow path to the first flow path when the temperature of the liquid fuel exceeds the vaporization temperature of the fuel.

If for any reason any of the individual portions of the retrofit assembly were to fail, a switch included in thermostat control unit 22 automatically controls solenoid 15 via connector line 15A to cause the output port 12B to close and output port 12C to open thereby bypassing the retrofit system of this invention.

Such a bypass function will carry the fuel along the first flow path directly to the carburetor or other fuel-air mixing device. The retrofit system will operate in the bypass mode until the malfunctioning condition is corrected such as by replacing a part.

If there is an electrical failure in the retrofit system such as in thermostat unit 22, the retrofit system will automatically change the solenoid-controlled valve 12 and operation of the vehicle will continue in the bypass mode with fuel traveling via fuel ports 12A and 12C.

Thermostat control unit 22 is an adjustable unit and in combination with sensor 24 may be set to maintain the desired fuel temperature moving into the fuel-air mixing device for the internal combustion engine. Therefore, the retrofit system of this invention enables the use of various types of fuel and a wide range of engine power output for the best vehicle performance.

An operator display light indicates that heater 19 is operating and that the fuel temperature is being maintained in the proper range. Such an operator display light may be placed on display panel 30 or otherwise located in the operator's compartment in the land vehicle.

Indicia 888 as shown in FIG. 9 represents either an actual temperature reading sensed by sensor 24 and received by thermostat unit 22 via electrical connector line 24A or represents the preset preselected temperature for the particular fuel being used to power the vehicle.

Power to the retrofit system of the invention operates off the ignition switch for the vehicle. Thus, when the ignition switch is "on" or "off," the retrofit device according to the invention is operable or inoperable, respectively.

Microvalve 14 is manually adjustable for all types and sizes of vehicles. Microvalve 14 controls the flow of fuel through the heating zone for feeding sufficient fuel to keep the horsepower of the engine at the manufacturer's rated levels.

The retrofit assembly is connected into the vehicle system downstream of the engine's fuel pump and overflow. Consequently, the gas tank of the vehicle never receives heated gasoline through the overflow as shown in FIG. 1.

The broad operating range of the preset preselected temperature is from about 160° F. to about 180° F. depending upon conditions such as fuel composition and octane rating. In a specific embodiment, the preselected temperature for the liquid fuel is maintained at about 178° to 179° F.

The retrofit system of the present invention may be used with any fuel-air mixing device such a fuel injection system or a carburetor as shown in the specific embodiment.

While the method of heating liquid fuel for internal combustion engine and apparatus therefor has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A liquid fuel preheating retrofit assembly for reducing exhaust pollutants and increasing fuel economy in an internal combustion engine, said assembly comprising:
   a) fuel heating means including electrical heat producing means and a preheating zone having an inlet and outlet,
   b) valve means for directing liquid fuel from a first flow path which extends from a liquid fuel supply to a fuel-air mixing device of an internal combustion engine into a second flow path through said heating means, and including means for disposing said valve means in said first flow path,
   c) means for controlling the volume of liquid fuel flow through said heating means at a location between the inlet and outlet of said preheating zone,
   d) said electrical heat producing means being effective to heat said liquid fuel as it moves along the second flow path through said preheating zone,
   e) sensor means for sensing the temperature of liquid fuel as it exits said preheating zone outlet, and
   f) electrical means connecting the sensor means to the electrical heat producing means for maintaining a continuous flow of the liquid fuel at a preselected temperature sufficient to expand the liquid fuel by a desired amount effective to achieve a fuel combustion in an internal combustion engine without vaporizing the liquid fuel before entering the fuel-air mixing device for said engine.

2. An apparatus as defined in claim 1 wherein said valve means for directing liquid from the first flow path includes a solenoid-controlled valve means,
said means for controlling the volume of liquid fuel flow includes adjustable valve means.

3. A liquid fuel preheating apparatus comprising:
   a) heating means including a preheating zone having an inlet and outlet,
   b) means for directing liquid fuel from a first flow path into a second low path through said heating means,
   c) means for controlling the volume of liquid fuel flow through said heating means at a location between the inlet and outlet of said heating zone,
   d) said heating means including a heating element effective to heat said liquid fuel as it moves along the second flow path through said heating zone,
   e) sensor means for sensing the temperature of liquid fuel as it exits said heating zone outlet, and
   f) means for maintaining the liquid fuel at a preselected temperature sufficient to expand the liquid fuel by a desired amount effective to achieve a fuel combustion in an internal combustion engine without vaporizing the liquid fuel before entering a fuel-air mixing device for said engine,
   g) said means for directing liquid from the first flow path includes a solenoid-controlled valve means,
   h) said means for controlling the volume of liquid fuel flow includes adjustable valve means,
   i) said heating means comprises a coil assembly including an inner tubular coil and an outer tubular coil,
   j) said outer tubular coil includes said heating zone inlet and said inner tubular coil includes said heating zone outlet,
   k) said inner and outer coils have inner ends connected to said adjustable valve means within said heating zone.

4. An apparatus as defined in claim 3 wherein
said heating zone is defined by a closed housing,
said inner and outer coils and adjustable valve means are disposed in said housing, and
said heating element includes an electrical heat generating component powered by a direct current source.

5. A liquid fuel preheating apparatus for use with an internal combustion engine, said apparatus comprising:
   a) heating means including electrical heat producing means and a preheating zone having an inlet and outlet,
   b) valve means for directing liquid fuel from a first flow path into a second flow path through said heating means,
   c) means located between a fuel pump and a fuel-air mixing device for controlling the volume of liquid fuel flow through said heating means at a location between the inlet and outlet of said heating zone,
   d) said heating means including a heating element effective to heat said liquid fuel as it moves along the second flow path through said heating zone,
   e) sensor means for sensing the temperature of liquid fuel as it exits said heating zone outlet, and
   f) means for maintaining the liquid fuel at a preselected temperature sufficient to expand the liquid fuel by a desired amount effective to achieve a fuel combustion in an internal combustion engine without vaporizing the liquid fuel before entering the fuel-air mixing device for said engine,
   g) said temperature maintaining means includes thermostat control means responsive to the temperature sensed by the sensor means to switch the heating element on and off to keep the temperature of the liquid fuel within ±2° F. of said preselected temperature.

6. An apparatus as defined in claim 5 wherein
said temperature maintaining means includes relay means electrically connected to a direct current source, to said heating element, and to said thermostat control means.

7. An apparatus as defined in claim 5 wherein
said valve means includes solenoid-controlled valve means having an input port and first and second output ports,
said input port receives delivery of liquid fuel from said first flow path,
said first output port is connected to said outer coil at said heating means inlet to direct fuel along a line defining said second flow path,
said second output port is connected said fuel-air mixing device to direct fuel along a line defining said first flow path, and
said solenoid-controlled valve means includes a solenoid powered by an electrical source and means to receive electrical signals to actuate the solenoid to direct fuel either through said first output port or through said second output port.

8. An apparatus as defined in claim 5 wherein
said thermostat control means includes first and second electrical input means, visual display means, toggle means and first and second switch means,
said first electrical input means is for manually presetting said preselected temperature,
said second electrical input means is for electrically receiving the actual elevated fuel temperature sensed at said heating zone outlet,
said visual display means is for selectively displaying said preset preselected temperature and said actual elevated fuel temperature at said heating zone outlet,
said toggle means is for changing the display means to either the display of the actual elevated outlet temperature or to said preset preselected temperature,
said first switch means is for inputting an electrical control signal to said valve means, and
said second switch means is for inputting an electrical control signal to said heating means.

9. An apparatus as defined in claim 5 wherein
said temperature maintaining means includes a manually operated switch located on a control panel within a land vehicle operator cabin.

10. In an internal combustion engine liquid fuel delivery system, a liquid fuel preheating assembly comprising:
a) housing means defining a heating zone having an inlet and an outlet,
b) a coil assembly including an outer tubular coil and an inner tubular coil each connected at one end thereof to adjustable valve means and being located within said heating zone,
c) said coil assembly defining a preheating flow path through said heating zone,
d) heating means disposed adjacent said inner tubular coil and within an area defined by the said inner tubular coil,
e) said adjustable valve means being effective to control the volume of fuel flow through the heating zone,
f) fuel directing means for selectively directing fuel into and away from said preheating flow path,
g) sensor means for sensing fuel temperature at the heating zone outlet of the inner tubular coil,
h) thermostat control means electrically connected to said heater means and to said fuel temperature sensor means,
i) visual display means for displaying a preselected preheating temperature and input means for manually presetting said preselected temperature,
j) means for electrically receiving the actual fuel temperature sensed by said fuel temperature sensor means, and
k) toggle means for changing the visual display means to display either said actual fuel temperature or said preset preselected temperature.

11. An assembly as defined in claim 10 wherein
said fuel temperature sensor means electrically signals said thermostat control means to activate or deactivate said heater means to maintain the sensed fuel temperature within 2° F. of said preset preselected temperature.

12. An assembly as defined in claim 10 wherein
said fuel directing means includes a solenoid-controlled valve means having an input port and first and second output ports,
said input port receives liquid fuel from a first flow path of said liquid fuel delivery system,
said first output port directs fuel to fuel-air mixing means for said internal combustion engine bypassing said preheating flow path,
said second output port directs fuel to said preheating flow path,
said solenoid-controlled valve means includes a solenoid powered by a direct current electrical source,
said fuel directing means includes manually operated first switch means that actuates the solenoid-controlled valve means to direct fuel either to said first output port or to said output port, and second switch means to activate or deactivate said heating means.

13. An assembly as defined in claim 12 wherein
the manually operated switch means is located on a control panel within an operator compartment of a land vehicle.

14. An assembly as defined in claim 10 wherein
said thermostat control means includes relay means connected to the heating means for selectively directing electrical power from a battery to the heating means.

15. A liquid fuel preheating process comprising:
a) directing liquid fuel from a first flow path into a second flow path that extends through a heating zone having an inlet and an outlet
b) controlling the volume of liquid fuel flow through the heating zone at a location between the inlet and outlet of said heating zone,
c) heating the liquid fuel as it flows along said second path through said heating zone,
d) sensing the temperature of the liquid fuel as it flows out of the heating zone outlet,
e) maintaining a continuous flow of the liquid fuel at a preselected temperature below the vaporization temperature of the liquid fuel and sufficient to expand the liquid fuel by a desired amount effective to achieve a fuel combustion in an internal combustion engine whereby pollutants in the exhaust emission of the engine are reduced in comparison with using unpreheated fuel, and
f) automatically directing the liquid fuel from the second flow path to the first flow path when any malfunction occurs in the preheating process.

16. A process as defined in claim 15 wherein
the preselected temperature is the maximum temperature at which the fuel remains in the liquid phase.

17. A process as defined in claim 16 wherein
said preselected temperature is in the range of about 5° F. to 10° F. less than the vaporization temperature of the fuel.

18. A process as defined in claim 15 wherein
the directing liquid fuel step includes automatically directing the liquid fuel from the second flow path to the first flow path when the temperature of the liquid fuel exceeds the vaporization temperature of the fuel.

19. A liquid fuel preheating process comprising:
a) directing liquid fuel from a first flow path into a second flow path that starts after a fuel pump location and extends through a heating zone having an inlet and an outlet, and introduces heated fuel into a fuel-air mixing zone at an elevated temperature, b) controlling the volume of liquid fuel within the heating zone as the fuel flows through the heating zone at a location between the inlet and outlet of said heating zone, c) electrically heating the liquid fuel as it flows along said second path through said heating zone, d) sensing the elevated temperature of the liquid fuel as it flows out of the heating zone outlet, and e) in response to the elevated temperature sensed in the temperature sensing step, maintaining the liquid fuel at a preselected temperature sufficient to expand the liquid fuel by a desired amount effective to achieve a fuel combustion in an internal combustion engine which reduces pollutants in the exhaust emission of the engine in comparison with using unpreheated fuel, f) the temperature maintaining step includes keeping the elevated temperature of the liquid fuel within ±2° F. of said preselected temperature.

20. In the process of supplying liquid fuel to an internal combustion engine wherein liquid fuel is directed along a path from a liquid fuel supply means to an inlet of an air-liquid fuel mixing means for producing a combustion mixture being directed into a combustion chamber of the internal combustion engine, the improvement comprising:

a) introducing the liquid fuel into the air-liquid fuel mixing means at an elevated preselected temperature in the range of about 5° F. to about 10° F. less than the vaporization temperature of the liquid fuel wherein the preselected temperature is sufficient to expand without vaporizing the liquid fuel, b) said introducing step including electrically heating the liquid fuel within a heating zone having an inlet and an outlet, c) controlling the volume of liquid fuel within the heating zone as the fuel flows through the heating zone, d) monitoring the outlet temperature of liquid fuel as it exits said heating zone, e) maintaining the amount of electrical heating within the heating zone in response to the temperature monitored during the monitoring step to produce a flow of liquid fuel at the preselected temperature below the vaporization temperature of the liquid fuel effective to achieve a fuel combustion in the internal combustion engine whereby pollutants in the exhaust emission of the engine are reduced in comparison with using unpreheated fuel.

21. In the process of supplying liquid fuel to an internal combustion engine wherein liquid fuel is directed along a path from a liquid fuel supply means to an inlet of an air-liquid fuel mixing means for producing a combustion mixture being directed into a combustion chamber of the internal combustion engine, the improvement comprising:

a) introducing the liquid fuel into the air-liquid fuel mixing means at an elevated preselected temperature sufficient to expand without vaporizing the liquid fuel, b) said introducing step including electrically heating the liquid fuel within a heating zone having an inlet and an outlet, c) controlling the volume of liquid fuel within the heating zone as the fuel flows through the heating zone, d) monitoring the outlet temperature of liquid fuel as it exits said heating zone, and e) maintaining the amount of electrical heating within the heating zone in response to the temperature monitored during the monitoring step to produce a flow of liquid fuel at the preselected temperature below the vaporization temperature of the liquid fuel effective to achieve a fuel combustion in the internal combustion engine whereby pollutants in the exhaust emission of the engine are reduced in comparison with using unpreheated fuel, f) the electrical heating maintaining step is effective to keep the temperature of the liquid fuel within ±2° F. of said preselected temperature.

22. In the assembly for supplying liquid fuel to an internal combustion engine wherein liquid fuel is directed along a path from a liquid fuel supply means to an inlet of an air-liquid fuel mixing means for producing a combustion mixture being directed into a combustion chamber of the internal combustion engine, the improvement comprising:

a) means for introducing the liquid fuel into the air-liquid fuel mixing means at an elevated preselected temperature sufficient to expand without vaporizing the liquid fuel, b) said liquid fuel introducing means including electrical means for heating the liquid fuel within a heating zone having an inlet and an outlet, c) valve means located within the heating zone for controlling the volume of liquid fuel flow through the heating zone, d) sensor means for monitoring the outlet temperature of liquid fuel as it exits said heating zone, e) thermostat means responsive to said sensor means for maintaining the amount of electrical heating within the heating zone to produce a flow of liquid fuel at the preselected temperature below the vaporization temperature of the liquid fuel effective to achieve a fuel combustion in the internal combustion engine whereby pollutants in the exhaust emission of the engine are reduced in comparison with using unpreheated fuel.

* * * * *

UNITED STATES PATENT AND TRADEMARK OFFICE
CERTIFICATE OF CORRECTION

PATENT NO.   :   5,219,399
DATED        :   June 15, 1993
INVENTOR(S)  :   Branislav V. Brana It is certified that error appears in the above-identified patent and that said Letters Patent is hereby corrected as shown below:

Title page, item [75], change Inventor's address to read;

--210 E. Flamingo, Apt. 233, Las Vegas, NV  89109--

Signed and Sealed this

First Day of March, 1994

Attest:

BRUCE LEHMAN

Attesting Officer

Commissioner of Patents and Trademarks